United States Patent
Ismert

[11] Patent Number: 5,876,000
[45] Date of Patent: Mar. 2, 1999

[54] UNIVERSAL PIPE BRACKET

[75] Inventor: Joseph P. Ismert, Kansas City, Mo.

[73] Assignee: Sioux Chief Manufacturing Company, Inc., Peculiar, Mo.

[21] Appl. No.: 965,497

[22] Filed: Nov. 6, 1997

[51] Int. Cl.⁶ .................................................. F16L 3/22
[52] U.S. Cl. ............................................ 248/65; 248/68.1
[58] Field of Search ............................. 248/49, 68.1, 65, 248/58, 73, 59, 57

[56] References Cited

U.S. PATENT DOCUMENTS

| | | |
|---|---|---|
| 998,112 | 7/1911 | Murray . |
| 1,050,235 | 1/1913 | Scanlan . |
| 1,057,057 | 3/1913 | Hoerr . |
| 1,129,553 | 2/1915 | Cope . |
| 2,288,845 | 7/1942 | Schilling . |
| 2,354,919 | 8/1944 | Lockwood .............................. 248/68.1 |
| 2,384,158 | 9/1945 | Carpenter et al. . |
| 2,675,978 | 4/1954 | Brown ..................................... 248/57 |
| 3,357,664 | 12/1967 | Geyer . |
| 3,884,438 | 5/1975 | Logsdon ................................... 248/59 |
| 3,944,175 | 3/1976 | Kearney .................................... 248/59 |
| 4,267,994 | 5/1981 | Lynch et al. ............................... 248/65 |
| 4,395,009 | 7/1983 | Bormke .................................. 248/68.1 |
| 4,687,185 | 8/1987 | Urano et al. ....................... 248/68.1 X |
| 4,717,099 | 1/1988 | Hubbard .................................. 248/57 |
| 4,865,280 | 9/1989 | Wollar .................................... 248/68.1 |
| 4,899,963 | 2/1990 | Murphy .................................... 248/65 |
| 4,899,964 | 2/1990 | Sick ...................................... 248/68.1 |
| 4,907,766 | 3/1990 | Rinderer .................................. 248/57 |
| 4,957,251 | 9/1990 | Hubbard ................................ 248/68.1 |
| 5,054,741 | 10/1991 | Ismert .................................. 248/74.5 |
| 5,149,026 | 9/1992 | Allen ................................... 248/68.1 |
| 5,354,952 | 10/1994 | Hickey ............................. 248/68.1 X |
| 5,593,115 | 1/1997 | Lewis ................................... 248/68.1 |

Primary Examiner—Ramon O. Ramirez
Attorney, Agent, or Firm—Litman, McMahon & Brown, L.L.C.

[57] ABSTRACT

A universal pipe bracket includes, at one end, an integral mounting flange portion with a pair of through bores positioned to receive mounting screws for attachment of the pipe bracket to a vertical surface, such as a wall stud. A four sided elongate bracket portion is attached to and extends outward from the flange portion and is designed to accommodate clamps which support, or are used for supporting the bracket by, pipes running both vertically and horizontally. The bracket can also be used in a trapeze support configuration.

20 Claims, 2 Drawing Sheets

Н,876,000

UNIVERSAL PIPE BRACKET

FIELD OF THE INVENTION

The present invention relates to a universal pipe bracket, and, more particularly, to such a pipe bracket which can readily be attached to an upright support, a pipe column, a horizontal pipe run, or suspended from a pair of bolts. The pipe bracket can support plumbing supply pipes via intervening attached pipe clamps, or directly via geared clamps or the like in both vertical and horizontal directions.

BACKGROUND OF THE INVENTION

A wide variety of brackets for mounting plumbing pipes, cables, conduits, wire bundles, etc. have been devised. Most such brackets are designed for attachment in a set configuration to a wall stud or other vertical support. Furthermore, known prior art brackets typically are designed to support plumbing pipes, cables, conduit, etc. exclusively in a single direction, i.e. either horizontally or vertically. A typical example of a prior art bracket is found in U.S. Pat. No. 5,149,026 to Allen, and entitled WIRE SUPPORT APPARATUS. The bracket disclosed in the Allen patent includes a plate portion with through holes designed to accept mounting screws for attachment to a vertically oriented wall stud or the like. An elongate horizontal bracket portion extends outward from the plate portion and includes a series of slots extending through it from side to side and arrayed along its length with the slots accommodating wire clips for securing wires thereon. The bracket disclosed in the Allen patent is somewhat typical in that it is designed to support wires extending in a single direction, and is capable of attachment only to a wall or other solid surface.

It is clear, then, that a need exists for a universal pipe bracket which can be attached to a wall stud or other vertically oriented structure, to a plumbing waste pipe which extends either vertically or horizontally, or suspended from a horizontally oriented support. Such a universal pipe bracket should preferably support pipes extending in either horizontal or vertical orientations. Finally, such a pipe bracket should be usable with a variety of pipe clamp designs.

SUMMARY OF THE INVENTION

The present invention is directed to a universal pipe bracket which is preferably made from molded plastic. The pipe bracket includes, at one end, an integral mounting flange portion with a pair of through bores positioned to receive mounting screws for attachment of the pipe bracket to a vertical surface, such as a wall stud. An elongate bracket portion is attached to and extends outward from the flange portion. The bracket portion has four sides, is preferably substantially square in cross sectional shape, and includes a respective pair of serrated ribs extending along the sides of each side of the square. The serrations in each pair of ribs form alternating shallow V shaped rests which form receptacles for accommodating a wide variety of pipe sizes. A plurality of mounting holes are positioned in each of the four sides of the bracket with the holes being spaced along the length of the bracket. The holes extending through each side of the bracket are preferably aligned with the holes extending through all of the other sides of the bracket. A series of slots also extend through the bracket from side to side, with the slots being arrayed in pairs on either side of each mounting hole and with the slots extending between a first pair of opposing sides of the bracket being staggered from the slots extending through an orthogonal second pair of opposing sides. A pair of large through bores are positioned near respective opposite terminal ends of the bracket portion with the large through bores being sized to accommodate a pair of threaded rods so that the universal bracket can be suspended as a trapeze support.

OBJECTS AND ADVANTAGES OF THE INVENTION

The principal objects of the present invention include: providing a universal pipe bracket; providing such a pipe bracket which can be, alternatively, attached to a vertical wall stud, attached to either a horizontal or vertical waste pipe, or suspended from threaded rods to form a trapeze mount; providing such a pipe bracket in which an elongate bracket portion is substantially square in cross section and includes a number of mounting bores spaced along it and extending through four different sides of the bracket portion; providing such a pipe bracket in which each side of the elongate bracket portion has a respective pair of opposing serrated ribs extending along it; providing such a pipe bracket which includes a plurality of through slots extending through the bracket portion between opposing sides with slots being staggered from slots extending between the orthogonal pair of opposing sides; and providing such a pipe bracket which is particularly well adapted for its intended purpose.

Other objects and advantages of this invention will become apparent from the following description taken in conjunction with the accompanying drawings wherein are set forth, by way of illustration and example, certain embodiments of this invention.

The drawings constitute a part of this specification and include exemplary embodiments of the present invention and illustrate various objects and features thereof.

DETAILED DESCRIPTION OF THE INVENTION

As required, detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Figure 1:
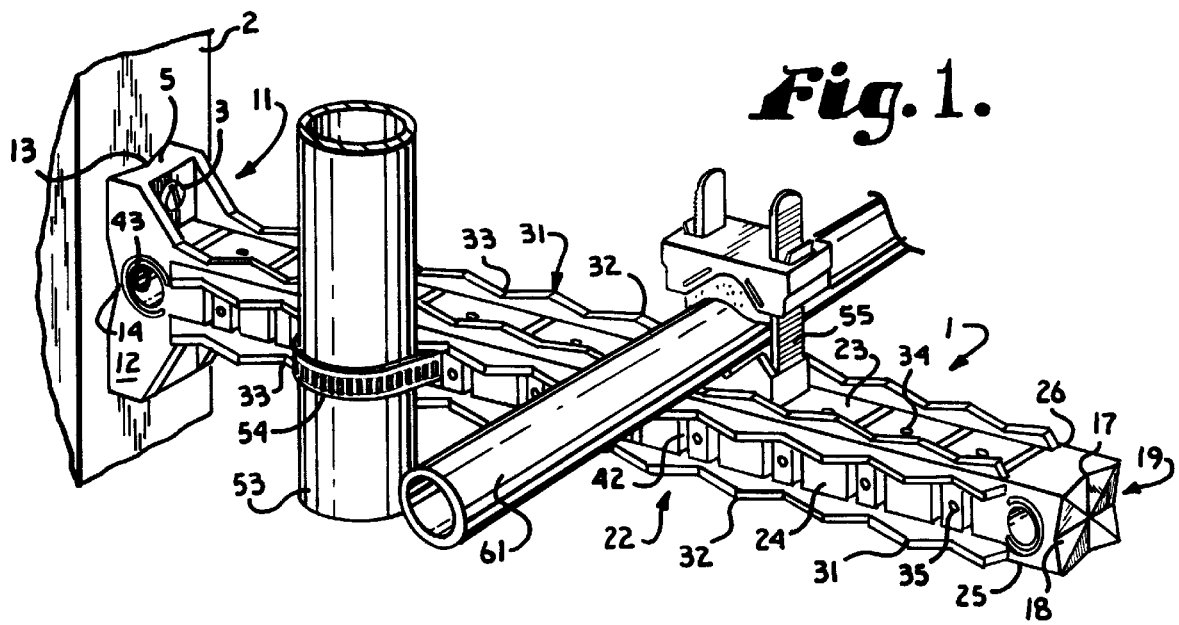
FIG. 1 is a perspective view of a universal pipe bracket in accordance with the present invention, shown attached to a vertically oriented wall stud and holding a horizontal plumbing supply pipe via a pipe clamp and a vertical vent pipe via a geared clamp.
Figure 2:
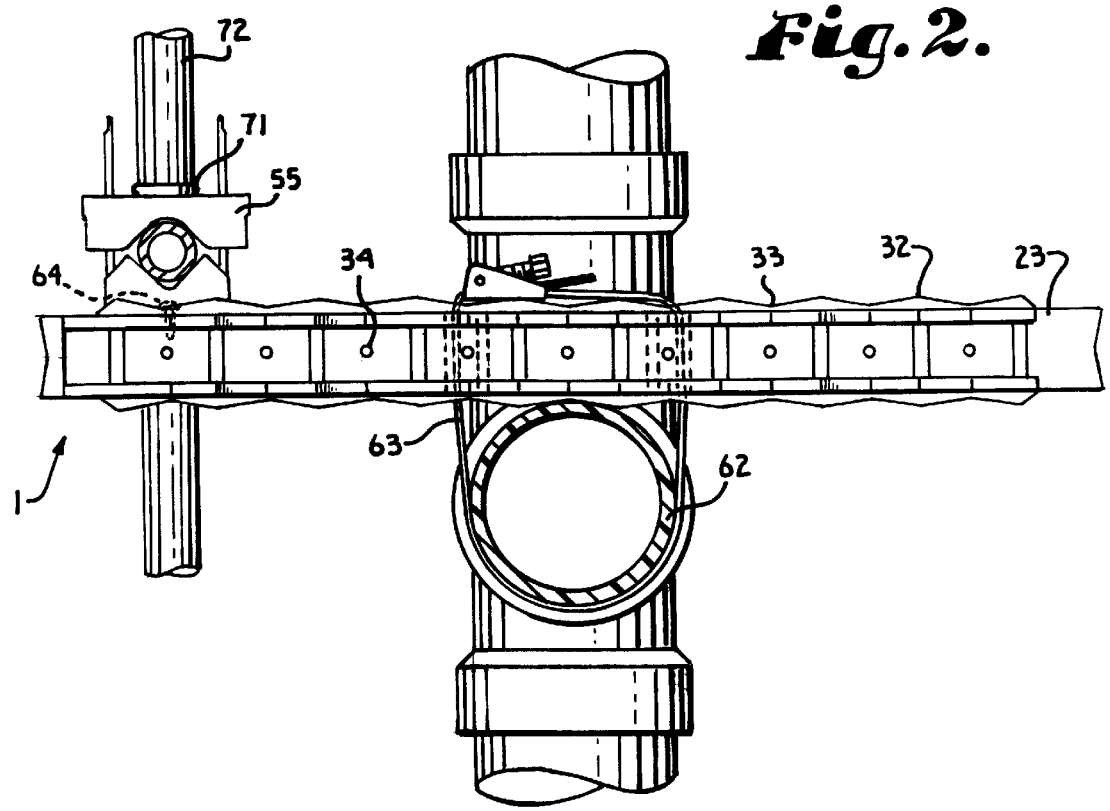
FIG. 2 is a front elevational view of the universal pipe bracket of FIG. 1, shown rotated 90 degrees from FIG. 1 and attached to a horizontally oriented waste pipe via a geared clamp, with the bracket supporting a horizontal supply pipe extending outward from a T fitting via an attached pipe clamp.
Figure 3:
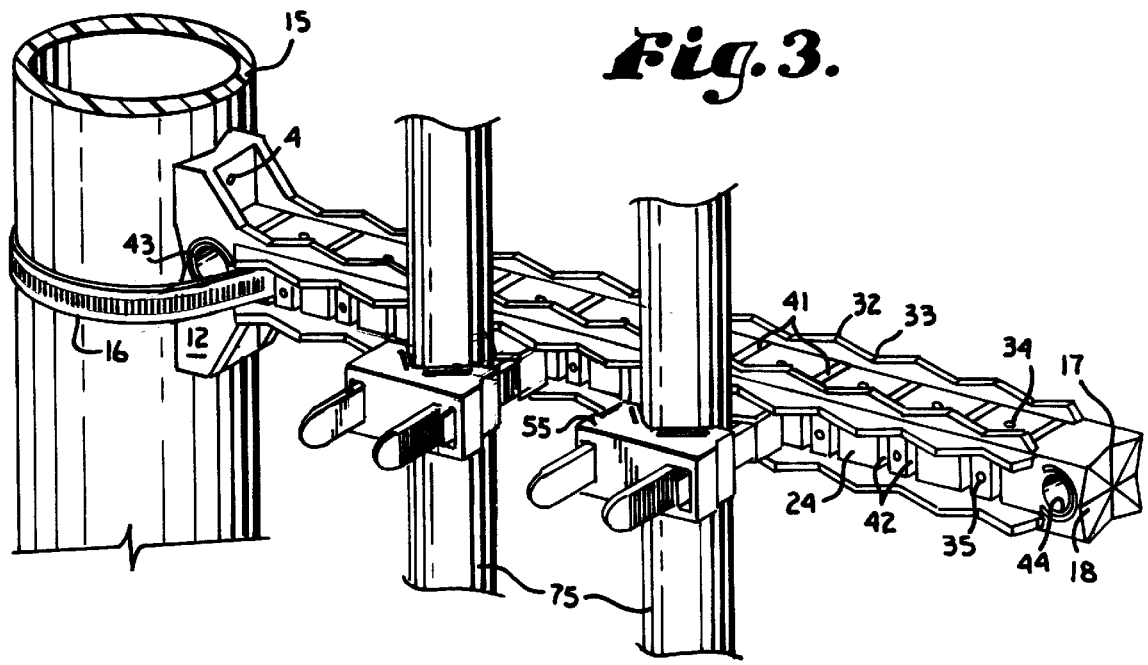
FIG. 3 is a perspective view of the universal pipe bracket of FIG. 1, shown oriented in the same direction as FIG. 1, and being attached to a vertically oriented waste pipe via a geared clamp, with the bracket supporting a pair of vertically oriented plumbing supply pipes via respective pipe clamps.

Referring to FIGS. 1–4, a the universal pipe bracket is illustrated and generally indicated at 1 in a variety of attachment positions and with a variety of pipe support configurations. The pipe bracket 1 is preferably made from molded plastic and, in FIG. 1, is shown attached to a vertically oriented wall stud 2 via a pair of screws 3. The screws 3 extend through respective through bores 4 (FIG. 3) extending through a substantially rectangular wall 5 of a flange portion 11 of the bracket 1. The flange portion 11 includes a pair of triangular wall sections 12, each of which extends outward orthogonally from the wall 5. A center portion of the wall 5 is indented inward from top to bottom in FIG. 1 to form a first V shaped notch 13. A second V shaped notch 14, oriented orthogonally to the first V shaped notch 13, is formed by a similar inward indentation in the wall 5 which extends from side to side in FIG. 1. As shown in FIG. 3, the first and second V shaped notches 13 and 14, respectively, provide multiple surfaces which securely engage cylindrical pipes or varying sizes, such as a vertically oriented waste pipe 15 to which the pipe bracket 1 in FIG. 3 is attached via a gear clamp 16. An additional pair of orthogonally oriented V shaped notches 17 and 18 are formed in a terminal end 19 of the bracket 1 opposite the flange portion 11.

The terminal end 19 forms a part of an elongate bracket portion 22 which is attached to and extends outward from the flange portion 11. The bracket portion 22 has four sides 23–26, and is preferably substantially square in cross sectional shape, and includes a respective pair of serrated ribs 31 extending longitudinally along the outside edges of each side 23–26. Each pair of ribs 31 includes plural serrations which form alternating peaks 32 and shallow V shaped depressions 33 which depressions 33 present opposing surfaces which form receptacles which can receive and support cylindrical pipes, conduits, etc. of a wide variety of diameters. A plurality of mounting holes 34 are positioned in each of the two opposing sides 23 and 25 of the bracket portion 22 with the holes 34 being spaced along the length of the bracket portion 22. An additional plurality of mounting holes 35 are positioned in each of the opposing sides 24 and 26 of the bracket portion 22, again with the holes 35 being spaced along the length of the bracket portion 22. The holes 34 are preferably aligned with the holes 35 along the bracket portion 22. A series of slots 41 extend through the bracket portion 22 between the two opposing sides 23 and 25 of the bracket portion 22, with the slots 41 being arrayed in pairs on either side of each mounting hole 34. A series of slots 42 extend through the bracket portion 22 between the two additional opposing sides 24 and 26 of the bracket portion 22, with the slots 42 also being arrayed in pairs on either side of each mounting hole 35, but being positioned closer to the respective mounting holes 34 than the slots 41 are to their respective mounting holes 34, i.e. the slots 41 are staggered in position with respect to the slots 42.

A first large through bore 43 extends through the bracket 1 between the triangular wall sections 12 of the bracket flange portion 11. A second large through bore 44 extends through the bracket 1 between the sides 24 and 26 near a terminal end 46 of the bracket portion 22. The through bores 43 and 44 accommodate a pair of threaded rods 51 so that the universal pipe bracket 1 can be suspended as a trapeze support, as described below.

As mentioned earlier, FIGS. 1–4 illustrate the universal pipe bracket 1 in a variety of attachment positions and with a variety of pipe support configurations and involving different pipe diameters, as explained more fully below.

In FIG. 1, the bracket 1 is attached to the wall stud 2 via the screws 3, as described above. The bracket 1 in FIG. 1 has a vertically oriented vent pipe 53 attached thereto via a geared clamp 54 extending through a pair of the slots 42 and resting in one of the V shaped depressions 33 formed by the serrated ribs 31. In addition, a double ratchet arm pipe clamp 55 is attached to the bracket 1 via a screw (not shown) extending into one of the mounting holes 34 in the bracket portion side 23. A supply pipe 61 is supported in a horizontal orientation via the clamp 55 and the bracket 1.

Referring to FIG. 2, the universal pipe bracket 1 is rotated 90 degrees from the position of FIG. 1 and is attached in a horizontal orientation to a horizontally oriented waste pipe 62 via a geared clamp 63 extending through a pair of the slots 42 in the bracket portion 22. Another double ratchet arm pipe clamp 55 is attached to the bracket 1 via a screw 64, shown in phantom lines, extending into one of the mounting holes 35 in the bracket portion side 26. The clamp 55 supports a horizontal supply pipe 65 extending out of a T connection 71 attached to a vertical supply pipe 72. Typically, the arrangement shown in FIG. 2 would be used for supporting hot and cold supply pipes on either side of a waste T for any type of plumbing fixture, such as a sink, tub, shower, etc., in which case a second T fitting and pipe clamp 55 would be arrayed on the right side of the waste pipe 62 via yet another pipe clamp 55.

FIG. 3 illustrates the universal pipe bracket 1 attached to a vertically oriented waste pipe 15 via the geared clamp 16 extending through one of the slots 42 in the bracket portion 22. The outside curvature of the waste pipe 15 is accommodated by the shallow V shaped notch 13 in the flange portion 11 of the bracket 1. In FIG. 3, a pair of vertically oriented supply pipes 75 are supported by respective double ratchet arm pipe clamps 55 attached to one of the mounting holes 35 and extending outward from the side 24 of the bracket portion 22.

Figure 4:
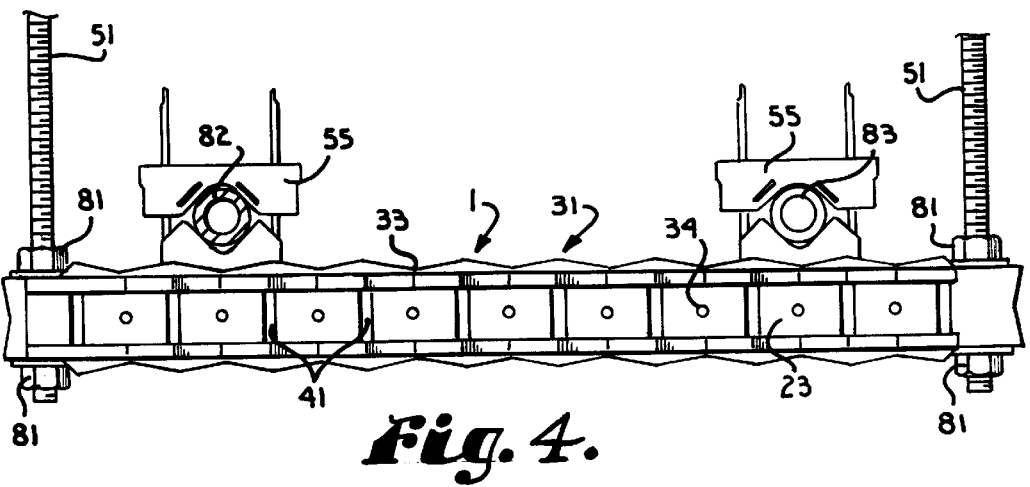
FIG. 4 is a front elevational view of the universal pipe bracket of FIG. 1, shown rotated 90 degrees from FIG. 1 and suspended via a pair of threaded rods to act as a trapeze support for a pair of plumbing supply pipes via respective pipe clamps.

Finally, FIG. 4 illustrates the universal pipe bracket 1 attached to form a "trapeze" support with the pair of threaded rods 51 and two pairs of threaded nuts and washers 81 arrayed on either side of the bracket 1. In this configuration the bracket 1 can be suspended from floor or ceiling joists, for example, to support lengthy runs of hot and cold supply pipe 82 and 83 via respective clamps 55. While FIG. 4 shows the bracket 1 in a horizontal position, the trapeze support arrangement shown can also be used to hold the bracket 1 in a vertical orientation with the pipe runs 82 and 83 stacked atop each other instead of being arrayed side by side. It is also apparent from FIG. 4 that the bracket 1 can easily support four supply pipe runs instead of 2. Furthermore, the pipes 82 and 83 can be directly supported in the V shaped depressions 33 formed by the serrated ribs 31 via geared clamps or nylon straps, etc. extending through the slots 42 instead of by added clamps 55.

While the pipe bracket 1 has been described and illustrated for use with plumbing pipes, it can be equally useful with electrical or communications cables or conduits, fiber optic bundles, wire bundles, or any other elongate structure to be held in place, and, therefore, the term "pipe" is not intended to be limiting. Particular details such as the placement of the slots 41 and 42 and the mounting holes 34 and 35 are intended to be examples only, and other arrangements will occur to those of skill in the art. The sharp zig-zag pattern of the serrated ribs 31 can be replaced with waves or gradual curves to create more rounded receptacles for pipes, and the term "serrations" as used in the claims is intended to encompass any alternating or undulating rib structure which forms pipe receptacles. Furthermore, while the serrated ribs 31 have been shown as uniform in size along the length of the bracket portion 22, they can be made of different sizes to better accommodate a variety of pipe diameters. It is thus to be understood that while certain forms of the present invention have been illustrated and described herein, it is not to be limited to the specific forms or arrangement of parts described and shown.

I claim:

1. A universal pipe bracket comprising an elongate, four sided bracket portion, said bracket portion including:
   a. four pairs of serrated ribs with each said rib pair extending longitudinally along a different respective one of said sides, the serrations within each rib pair being aligned to form receptacles for cylindrical objects.

2. A universal pipe bracket as in claim 1, and further comprising a mounting flange portion with a mounting wall which extends in a direction orthogonal to the longitudinal length of said bracket portion, said mounting wall including at least one mounting aperture.

3. A universal pipe bracket as in claim 2, wherein said mounting wall of said mounting flange portion is indented inward from top to bottom to form a first V shaped notch.

4. A universal pipe bracket as in claim 3, wherein said mounting wall of said mounting flange portion is also indented inward from side to side to form a second V shaped notch which is oriented orthogonally to the first V shaped notch.

5. A universal pipe bracket as in claim 1, wherein each said side of said bracket portion comprises a plurality of mounting bores formed therein and spaced along the length of said bracket portion.

6. A universal pipe bracket as in claim 1, and further comprising a first plurality of slots extending through said bracket portion between a first, opposing, pair of said sides, said first plurality of slots being spaced along the length of said bracket portion.

7. A universal pipe bracket as in claim 6, and further comprising a second plurality of slots extending through said bracket portion between a second, opposing pair of said sides, said second plurality of slots also being spaced along the length of said bracket portion and being staggered with respect to said first plurality of slots.

8. A universal pipe bracket as in claim 1, and further comprising a pair of relatively large through bores extending through said bracket between an opposing pair of said sides, each one of said pair of through bores being positioned near a different respective terminal end of said bracket.

9. A universal pipe bracket comprising:
   a. an elongate, four sided bracket portion, said bracket portion including four pairs of serrated ribs with each said rib pair extending longitudinally along a different respective one of said sides, the serrations within each rib pair being aligned to form receptacles for cylindrical objects; and
   b. a mounting flange portion with a mounting wall which extends in a direction orthogonal to the longitudinal length of said bracket portion, said mounting wall including at least one mounting aperture extending there through.

10. A universal pipe bracket as in claim 9, wherein said mounting wall of said mounting flange portion is indented inward from top to bottom to form a first V shaped notch.

11. A universal pipe bracket as in claim 10, wherein said mounting wall of said mounting flange portion is also indented inward from side to side to form a second V shaped notch which is oriented orthogonally to the first V shaped notch.

12. A universal pipe bracket as in claim 9, wherein each said side of said bracket portion comprises a plurality of mounting bores formed therein and spaced along the length of said bracket portion.

13. A universal pipe bracket as in claim 12, and further comprising a second plurality of slots extending through said bracket portion between a second, opposing pair of said sides, said second plurality of slots also being spaced along the length of said bracket portion and being staggered with respect to said first plurality of slots.

14. A universal pipe bracket as in claim 9, and further comprising a first plurality of slots extending through said bracket portion between a first, opposing, pair of said sides, said first plurality of slots being spaced along the length of said bracket portion.

15. A universal pipe bracket as in claim 9, and further comprising a pair of relatively large through bores extending through said bracket between an opposing pair of said sides, each one of said pair of through bores being positioned near a different respective terminal end of said bracket.

16. A universal pipe bracket comprising an elongate, solid four sided bracket portion, said bracket portion including:
   (a) a first plurality of slots extending through said bracket portion between a first, opposing, pair of said sides, said first plurality of slots being spaced along the length of said bracket portion; and
   (b) a second plurality of slots extending through said bracket portion between a second, opposing pair of said sides, said second plurality of slots also being spaced along the length of said bracket portion and being staggered with respect to said first plurality of slots.

17. A universal pipe bracket as in claim 16, said bracket portion further comprising:
   (a) four pairs of serrated ribs with each said rib pair extending longitudinally along a respective one of said sides, the serrations within each rib pair being aligned to form receptacles for cylindrical objects.

18. A universal pipe bracket as in claim 16, and further comprising a mounting flange portion with a mounting wall which extends in a direction orthogonal to the longitudinal length of said bracket portion, said mounting wall including at least one mounting aperture and wherein said mounting wall of said mounting flange portion is indented inward from top to bottom to form a first V shaped notch and is also indented inward from side to side to form a second V shaped notch which is oriented orthogonally to the first V shaped notch.

19. A universal pipe bracket as in claim 16, wherein each said side of said bracket portion further comprises a plurality of mounting bores formed therein and spaced along the length of said bracket portion.

20. A universal pipe bracket as in claim 16, and further comprising a pair of relatively large through bores extending through said bracket between an opposing pair of said sides, each one of said pair of through bores being positioned near a different respective terminal end of said bracket.

* * * * *